UNITED STATES PATENT OFFICE.

CARL FRIEDRICH CLAUS, OF LONDON, ENGLAND.

PROCESS OF OBTAINING SULPHUR FROM SULPHURETED HYDROGEN.

SPECIFICATION forming part of Letters Patent No. 354,393, dated December 14, 1886.

Application filed November 19, 1883. Serial No. 112,176. (No specimens.)

*To all whom it may concern:*

Be it known that I, CARL FRIEDRICH CLAUS, of London, England, chemist, have invented a new and useful Improved Process of Obtaining Sulphur from Sulphureted Hydrogen, of which the following is a specification.

The present invention relates to a process or method of obtaining sulphur from sulphureted hydrogen. I have previously made an application, dated September 26, 1883, Serial No. 107,424, for a patent for a process of obtaining sulphur from sulphide of hydrogen. In said former process sulphide of hydrogen is passed, with a quantity of atmospheric oxygen or air equivalent to the hydrogen of the sulphide of hydrogen, through layers of anhydrous oxide of iron, whereby free sulphur is produced, and the temperature necessary for the continuance of the reaction is also maintained. This former process is applicable either when the sulphur produced is collected as such or when it is burned (by further admission of air) into sulphurous acid. In carrying this process into effect, with rich or pure oxide of iron I have found that the heat developed by the reaction in some cases exceeds that most favorable for its good working, and that in consequence the oxide of iron is liable to form clinkers or masses of the material fused together.

The object of this invention is to overcome these results; and it consists in the admixture, with the oxide of iron or pyrophoric substance, of any material which, while not interfering with the reaction in the oxide of iron, will surround the particles of the latter and keep the same sufficiently far apart to prevent the formation of clinkers or the fusing into masses.

In carrying my invention into practice I place the reagent substance—oxide of iron—into a suitable kiln or closed chamber, and mix therewith, in suitable proportions, a substance that will separate the particles of the oxide of iron from each other and hold the same apart. Many substances may be used for this purpose—for instance, lime, magnesia, or their carbonates, sulphates, or sulphides; alumina or silicate of alumina; baryta or strontia, or their carbonates, sulphates, or sulphides, or metallic oxides, such as oxide of chromium or manganese; or I may use finely-divided charcoal. Into the kiln or chamber containing the oxide of iron, admixed with any of the substances above set forth, I pass a mixture of atmospheric air and sulphide of hydrogen. In practice the oxide of iron may rest on a perforated false bottom of the kiln or chamber, and beneath said false bottom are openings for admitting the atmospheric air and sulphide of hydrogen, or, instead of the former, the air equivalent to the hydrogen of the sulphide of hydrogen. The admixture of air with the sulphide of hydrogen will cause the latter to be absorbed or decomposed by the oxide of iron, which then becomes a pyrophoric contact substance. The temperature of the latter, when once raised to the degree required for the reaction to take place, is maintained by the continued admission of air, and thus free sulphur is formed, which escapes through an aperture in the kiln or chamber above the pyrophoric contact substance. The sulphur is conveyed thence into suitable chambers and collected. When an excess of air is admitted into the kiln or chamber, sulphurous acid is produced instead of free sulphur.

Heretofore illuminating-gas has been purified by passing it through finely-divided oxides of iron, mingled with various separating substances—such as lime, sawdust, and other materials—to prevent the ore from cohering in hard masses, through which the gas could not penetrate.

I claim—

The herein-described process of obtaining sulphur or sulphurous acid, consisting in passing a mixture of sulphide of hydrogen and atmospheric air through a chamber or kiln containing oxide of iron admixed with lime, magnesia, alumina, or other like substances, as and for the purpose set forth.

In testimony whereof I have hereunto signed my name in the presence of two subscribing witnesses.

CARL FRIEDRICH CLAUS.

Witnesses:
JOHN T. KNOWLES,
ROWLAND G. BROWN.